(12) United States Patent
Khanmamedov

(10) Patent No.: US 6,506,349 B1
(45) Date of Patent: *Jan. 14, 2003

(54) PROCESS FOR REMOVAL OF CONTAMINANTS FROM A GAS STREAM

(76) Inventor: Tofik K. Khanmamedov, 2934 Beltline Rd., Garland, TX (US) 75044

( * ) Notice: Subject to any disclaimer, the term of this patent is extended or adjusted under 35 U.S.C. 154(b) by 0 days.

This patent is subject to a terminal disclaimer.

(21) Appl. No.: 08/887,149

(22) Filed: Jul. 2, 1997

Related U.S. Application Data

(63) Continuation-in-part of application No. 08/670,796, filed on Jun. 21, 1996, now Pat. No. 5,716,587, which is a continuation of application No. 08/333,649, filed on Nov. 3, 1994, now abandoned.

(51) Int. Cl.⁷ .............................................. B01D 53/48
(52) U.S. Cl. ...................... 423/210; 423/220; 423/228; 423/242.1; 423/573.1; 423/DIG. 5
(58) Field of Search ........................... 423/DIG. 5, 220, 423/228, 242.1, 573.1, 574.1, 210; 95/187, 235, 236; 422/111

(56) References Cited

U.S. PATENT DOCUMENTS

| | | | |
|---|---|---|---|
| 4,001,396 A | 1/1977 | Klein et al. | 423/574 L |
| 4,153,674 A | 5/1979 | Verloop et al. | 423/573 R |
| 4,210,627 A | 7/1980 | Verloop et al. | 423/220 |
| 4,263,270 A | 4/1981 | Groenendaal | 423/573 R |
| 4,483,834 A | 11/1984 | Wood | 423/228 |
| 4,749,555 A * | 6/1988 | Bush | 423/228 |
| 4,889,700 A | 12/1989 | Elgue et al. | 423/220 |
| 5,397,556 A | 3/1995 | Towler et al. | 423/220 |
| 5,422,086 A | 6/1995 | Bowman | 423/220 |
| 5,458,861 A | 10/1995 | Buchanan et al. | 423/244.1 |
| 5,556,606 A * | 9/1996 | Khanmamedov | 423/228 |
| 5,718,872 A * | 2/1998 | Khanmamedov | 422/168 |

OTHER PUBLICATIONS

Kohl et al. *Gas Purification* 4th Edition Published by Gulf Publishing Co. Houston TX USA, ISBN 0–87201–314–6 pp. 451–454, 721, 735 and 842 1985, no month.*

* cited by examiner

Primary Examiner—Stanley S. Silverman
Assistant Examiner—Timothy C. Vanoy
(74) Attorney, Agent, or Firm—Jeffrey T. Hubbard; Kelly & Hubbard

(57) ABSTRACT

A selected contaminant is removed from a gas stream containing an unselected component that is also absorbed by the solvent, although to a lesser degree than the selected contaminant. In a typical application, hydrogen sulfide is removed from a natural gas stream that contains carbon dioxide as an unselected component. The process employs a solvent absorption/regeneration sequence, carried out in an absorber and regenerator, to remove the selected contaminant (hydrogen sulfide, for example) from the gas stream. The overhead gas from the regenerator has a higher concentration of the selected contaminant than the original gas stream. This contaminant rich overhead gas stream is partially employed as a recycle stream that is combined with the original gas stream, with the resulting combined gas stream being fed to the absorber. The increased partial pressure of the selected contaminant in the absorber shifts the operating point, resulting in increased absorption of the selected contaminant relative to the unselected component. The regenerator overhead gas has a relatively high concentration of the selected contaminant.

15 Claims, 3 Drawing Sheets

PROCESS FOR REMOVAL OF CONTAMINANTS FROM A GAS STREAM

This application is a continuation-in-part of U.S. application Ser. No. 08/670,796, filed Jun. 21, 1996, now U.S. Pat. No. 5,716,587, which is a file wrapper continuation of U.S. application Ser. No. 08/333,649, filed Nov. 3, 1994, now abandoned.

TECHNICAL FIELD

This invention relates to the treatment of gas streams, and in particular to an improved method for solvent extraction of hydrogen sulfide and other contaminants from sour gas feed stocks, tail gases, ammonia, and flue gas streams.

BACKGROUND OF THE INVENTION

Hydrocarbon fuel sources such as crude oil, natural gas and coal are often contaminated by significant amounts of sulfur compounds. When the sulfur compounds are burned, objectionable odors and pollutants are created. The extraction of sulfur, generally present in the form of hydrogen sulfide, from feedstocks and tail gases is thus a vital aspect of refinery, natural gas and coal liquification operations.

Hydrogen sulfide is usually removed by solvent extraction, with subsequent regeneration and recycle of the solvent. In many cases, carbon dioxide is also present in significant amounts. The solvent must therefore be selective for hydrogen sulfide in the presence of carbon dioxide. Suitable solvents include aqueous solutions of secondary and tertiary amine, such as diisopropylamine (DIPA), methyldiethanolamine (MDEA) and triethanolamine (TEA). The feedstock gas is contacted with the amine at relatively low temperatures in an absorber to remove the hydrogen sulfide. This step produces a rich amine stream, loaded with $H_2S$ and $CO_2$. This rich amine is passed to a stripper/regenerator, usually a tray type column. The solvent is heated and gives off a concentrated acid gas, leaving a lean amine stream that is recycled as fresh solvent to the absorber. The $H_2S$ rich concentrated acid gas is routed to a sulfur recovery unit to be converted into elemental sulfur by the well known Claus process:

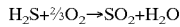  1)

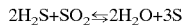  2)

The Shell Claus Off-gas Treating (SCOT) process for removing sulfur components from Claus plant tail gas was first brought on stream in 1973. Since then, the process has been widely used in the oil refining and natural gas industries, with more than 150 units constructed all over the world. In the standard SCOT process, sulfur compounds in Claus plant tail gas are catalytically converted into hydrogen sulfide. After cooling, the hydrogen sulfide is removed by solvent extraction, in the manner already discussed. The SCOT off-gas (the gas not absorbed in the absorber) is incinerated.

The advantage of the SCOT process is the use of familiar refining technologies. Application of the SCOT process for different types of gas treating units and Claus units raises special design considerations. The sulfur dioxide emissions from the Claus and tail gas treating plants make a significant contribution to the total sulfur dioxide emissions from a refinery. It is therefore important to reduce the sulfur dioxide emissions from these plants to the lowest possible levels.

The standard SCOT process is able to recover 99.9% of total sulfur, resulting in a 250 ppmv sulfur concentration in the SCOT off-gas. In recent years, the demand for higher sulfur recovery efficiencies has resulted in the development of two improved versions to the SCOT process. These are the Low-sulfur SCOT and the Super-Scot processes. The new processes lower the total sulfur content in the SCOT off-gas to less than 50 ppmv, while maintaining low operating costs.

The Low sulfur-SCOT (LS-SCOT) version is characterized by the use of an inexpensive additive to the amine solvent. This additive improves the regeneration of the solvent, and produces regenerated solvent having less hydrogen sulfide, which in turn results in a lower off-gas hydrogen sulfide concentration. Treated off-gas specifications as low as 10 ppmv hydrogen sulfide can be achieved. Because of the additive, LS-SCOT units are preferably designed as a stand-alone SCOT unit. However, the LS-SCOT version has also been tested successfully on integrated SCOT units with DIPA and MDEA solvents.

The Super-SCOT version is based on improved stripping by two-stage regeneration and improved absorption by using a lower lean solvent temperature. These two features can be applied separately or in combination.

The performance of an amine regenerator is normally limited by the equilibrium conditions in the bottom. This condition leads to a direct relationship between stripping steam and the solvent leanness. In order to produce leaner solvent (mol $H_2S$/mol amine), a higher specific steam rate (kg steam/$m^3$ solvent) is required. As in the LS-SCOT method, a leaner regenerated solvent will result in a lower hydrogen sulfide concentration in the SCOT off-gas. However, it is not necessary to regenerate the entire solvent flow to this lower leanness level. The Super-SCOT process therefore uses two-stage regeneration, in which part of the amine solvent flow is more deeply stripped. The resulting super-lean solvent is routed to the top tray of the absorber, while the normal lean solvent enters half-way up the absorber. The use of an additive changes the equilibrium conditions; less steam is required for the same leanness, or a greater leanness can be achieved with the same steam rate.

It is well known that the solubility of hydrogen sulfide in amine solvents increases when the temperature is lowered. Thus, using a lower amine temperature results in improved extraction of hydrogen sulfide from the feed gas, which enables a lower hydrogen sulfide concentration to be achieved compared to the normal SCOT process.

The Super-SCOT method has been shown to achieve a hydrogen sulfide concentration of 10 ppmv $H_2S$ or a total sulfur concentration of less than 50 ppmv, and to reduce steam consumption by 30% compared to the standard SCOT unit. Cascading the solvent similar to the standard SCOT is an option to save operating costs.

Because the acid gas from the SCOT regenerator is recycled back to the Claus feed gas, it is important that inert ingredients in the concentrated acid gas be as low as possible in order to avoid build up of inerts, which can severely limit throughput in the Claus/SCOT system. As already discussed, carbon dioxide, which is not treated by the SCOT process, is often present in significant quantities. Therefore, the solvent used in the SCOT process should preferably absorb hydrogen sulfide more readily than it will absorb carbon dioxide.

Because the capacity of the sulfur recovery plant is critical to the capacity for producing finished product, there is continued interest in improving Claus plant capacities and several incremental improvements have been developed for the refining industries.

U.S. Pat. No. 4,263,270, issued to Groenendaal et al., discloses a process for handling gases containing large quantities of hydrogen sulfide and carbon dioxide. Hydrogen sulfide and $CO_2$ are extracted by absorption, then the absorbed gas is subjected to the Claus process. The Claus off-gas is reacted in the presence of a catalyst with hydrogen or carbon monoxide, followed by a second extraction that is $CO_2$ selective. Some of the feed gas is bypassed around the Claus unit in some cases.

U.S. Pat. No. 4,153,674, issued to Verloop et al., discloses a process for treating a gas stream that is high in $CO_2$, low in $H_2S$, and also contains significant amounts of COS or other organic sulfur compounds. The process is quite similar to that disclosed in Groenendaal et al., except that the feed gas always bypasses the Claus unit, and is combined with the Claus off-gas before entering the catalytic reactor.

U.S. Pat. No. 4,001,386, issued to Klein et al., discloses a process using cascaded absorbers with a common desorbtion column. A Claus plant and reactor like that in Groenendaal treat the first absorber off-gas before it is fed to the second absorber. The absorbent from the second absorber is cascaded through the first absorber before being desorbed, so that the desorber always processes absorbent having higher $H_2S$ partial pressure than that of the Claus off-gas.

U.S. Pat. No. 4,153,674, issued to Verloop et al., discloses a Claus process adapted for increasing the $H_2S$ concentration in a gas stream, particularly a gas stream to be fed to a Claus unit. In this process, the feed gas stream flow rate is measured prior to entering an absorber. If this measurement falls below a preset value, a second absorber is connected in tandem into the process similar to the cascaded configuration of Klein et al.

U.S. Pat. No. 4,483,834, issued to Wood, discloses a solvent extraction system that uses an added splitter column to separate the regenerator overhead stream into an $H_2S$ stream and a $CO_2$ stream, followed by recycling the $CO_2$ stream back to the absorber inlet. The method has the disadvantage that separation of $H_2S$ and $CO_2$ is reduced by recycling the $CO_2$.

The foregoing patents show the continued interest and need for the development of processes that can remove contaminants from gas feedstocks with lower operating costs and more complete removal of sulfur from the gas. A process that can achieve these results with lower capital investment is also desired.

SUMMARY OF THE INVENTION

The object of the present invention is to remove a selected contaminant, by means of solvent extraction, from a gas stream that also contains unselected components that can be absorbed in significant amounts. Another object is to achieve the previous object with minimal modification of existing apparatus. Still another object, for streams containing sulfurous contaminants, is to achieve more complete overall removal of sulfur from the gas stream than the conventional SCOT process. A final object is to maximize the capacity of downstream units by reducing the amount of unselected components present in the gas stream discharged from the regenerator.

In general, these objects are achieved by a modified solvent extraction method. The solvent used should have a marked capacity for absorption of the selected contaminant, and relatively less absorption capacity for the unselected components in the gas stream. That is, the solvent used has relative absorption constants greater than one, for the selected contaminants relative to the unselected components. These constants vary directly in proportion to the partial pressure of the selected contaminants in the feed stream, i.e. the absorption capacity of the solvent for the selected contaminants increases with the partial pressure of the contaminants, and does so more quickly than the absorption capacity for the unselected components. Either physical solvents, such as water, propylene carbonate or methyl cyanoacetate, or chemical solvents, such as monoethanol amine (MEA), diethanol amine (DEA) or N-methyl-diethanol amine (MDEA) can be used in such a process. A portion of the contaminant rich gas from the regenerator overhead is recycled and mixed with the gas stream entering the absorber. This raises the partial pressure of the selected contaminants in the gas fed to the absorber, causing a shift in the relative absorption constants that in turn causes greater absorption of the selected contaminants and less absorption of the unselected components. Thus, the separation between the selected contaminants and the unselected components is improved.

An obvious advantage of the improved separation for sulfurous contaminants is that less of the unselected components are sent to any downstream sulfur recovery unit (e.g. $CO_2$ to a Claus process), so the sulfur recovery unit need not be sized to handle the additional gas loading. Greater rejection of the unselected components at the absorber results in a lower total mass flow rate to the sulfur removal unit without significantly affecting the flow rate of the selected contaminants. Thus, either a smaller, less expensive sulfur removal unit may be used or an existing sulfur removal unit can be run at greater capacity.

Another advantage of the invention is the more complete removal of the selected contaminants, due mainly to the improved absorption achieved from increasing the partial pressure of the contaminants fed to the absorber. The efficiency of the basic absorption-regeneration process and the overall efficiency of tail gas treatment are improved.

Finally, the method of the invention can be practiced using a single absorber, instead of both a non-selective absorber and a selective absorber, as in the Groenendaal et al., Klein et al., and Verloop et al. methods. The method also does not require additional columns for further processing of the regenerator overhead gas, as in the Wood method. This results in capital and construction cost savings. However, cascaded absorbers and regenerators can still be employed to improve yield or operating costs, just as in the aforementioned methods.

These and other advantages and features of the invention will be apparent from the following detailed description and the associated drawings.

DETAILED DESCRIPTION OF THE DRAWINGS

Figure 1:
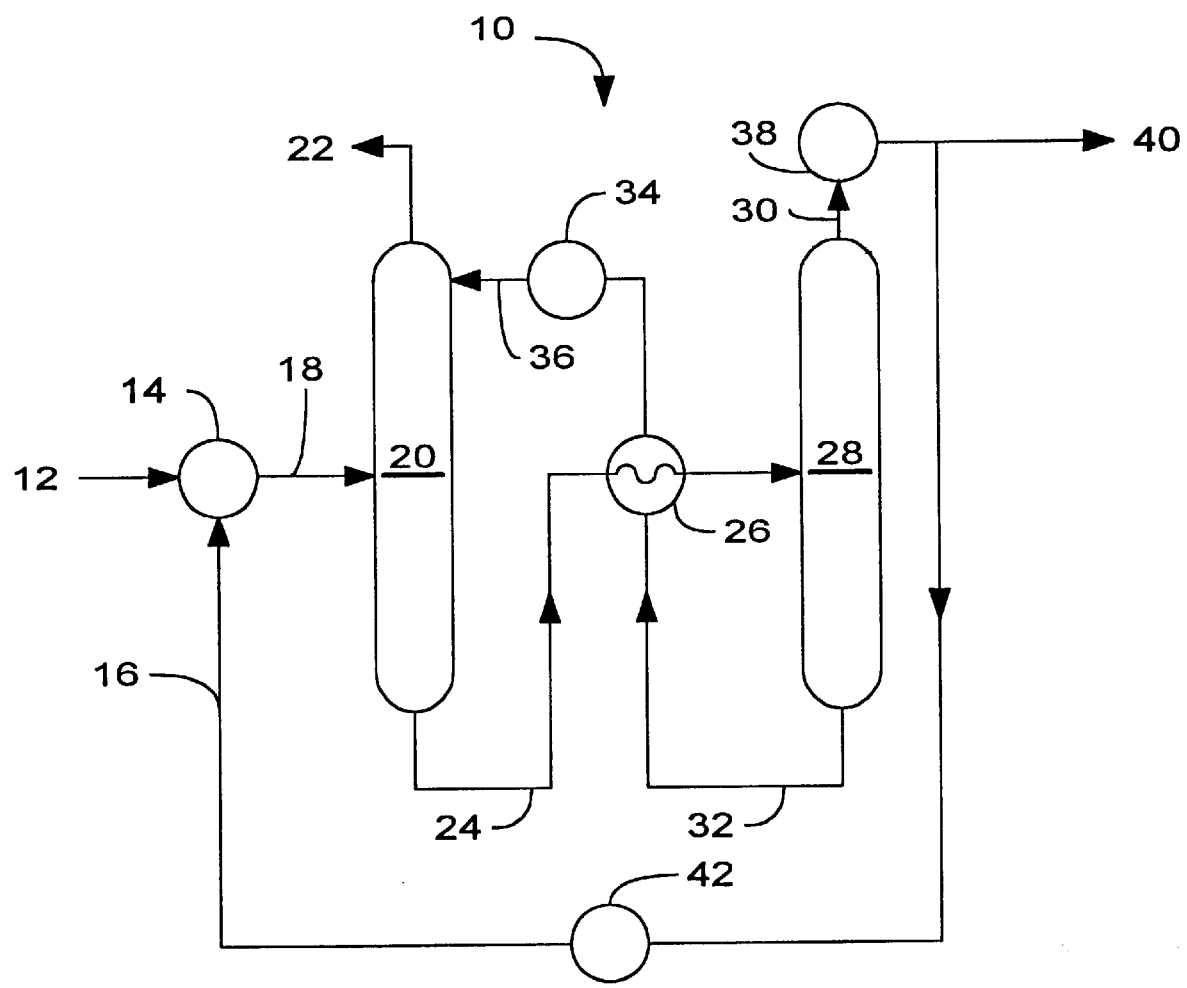
FIG. 1 shows a schematic of a general embodiment of the process of the invention.

FIG. 1 shows a general case absorption-regeneration process 10 according to the invention, intended to treat a gas stream 12 having a selected contaminant and one or more unselected components. For the following discussion, selected contaminant is defined as one or more chemical components in the stream that is/are intended to be absorbed by the solvent. The unselected components are defined as those components not intended to be absorbed, although some significant absorption can occur. Each of these components depends on the type of gas stream being treated. Table 1 lists some areas where the process of the invention can be employed, along with the selected contaminant and unselected component(s) for each case.

TABLE 1

| Process | Selected Contaminant | Unselected Component(s) |
| --- | --- | --- |
| Petroleum Treating | $H_2S$, COS, $CS_2$ | $CO_2$, $H_2O$ |
| Ammonia Manufacture | $H_2S$, COS, $CO_2$ | $NH_4$, $N_2$, $H_2$ |
| Natural Gas Treating | $H_2S$, $CO_2$ | LNG Feedstock |
| Coal Gasification Treating | $H_2S$, COS | $CO_2$ |
| Refinery Fuel Gas Treating | $H_2S$, COS | $CO_2$ |
| Flue Gas Treating | $SO_2$ | $CO_2$, $NO_x$ |

The feed gas stream 12 is fed to a mixer 14 and mixed with a hereafter described recycle stream 16, and the combined gas stream 18 is fed to an absorber 20. In the absorber 20, the selected contaminant is absorbed by a contaminant lean solvent having the properties already discussed. A physical solvent working at relatively high pressure (in the range of 300 psia) can be used for processing natural gas to remove $CO_2$, $H_2S$, COS and $CS_2$, while a chemical solvent is used for processing oil refinery or coal liquification acid gas. Chemical solvents are preferable in the latter case because they can be used to absorb the selected contaminant at slightly more than ambient pressure. A sweetened gas stream 22, with minimal selected contaminant content, is discharged overhead from the absorber 20, and a selected contaminant rich solvent stream 24 is discharged from the bottom of the absorber 20. The contaminant rich solvent stream 24 is preheated in a heat exchanger 26 and sent to a regenerator 28.

In the regenerator 28, the selected contaminant is driven out of the rich solvent stream 24 by heating. The released gas stream emerges from the regenerator overhead as a contaminant rich gas stream 30. The remaining contaminant lean solvent stream 32, now substantially free of selected contaminant, is used to heat the contaminant rich solvent 24 in the heat exchanger 26. The lean solvent stream 32 is further cooled in a cooler 34 before being recycled as a fresh solvent stream 36 to the absorber 20.

After passing through a cooler 38, the contaminant rich gas stream 30 is physically split into two chemically identical streams: a product stream 40 and a recycle stream 16. This splitting can be achieved by any of the normal means used to split gas streams. Some examples include a three-way control valve, two independent control valves, or two independent flow restriction devices such as critical flow orifices. Variable flow control elements are preferred, as these allow the process to be easily controlled for optimum recycle rate, as will be discussed in a later embodiment. The product stream 40 is passed to another process unit, such as a sulfur recovery unit. If the product stream 40 does not require cooling, the cooler 38 can be used in the recycle stream alone.

A novel-feature of the invention is the recycling of the recycle stream 16 to the mixer 14, where it is mixed with the feed gas stream 12. While recycling is common in chemical processing, recycling the regenerator overhead gas has not, in the inventor's knowledge, been employed for solvent extraction. For this discussion, recycling means the returning of all or a fraction of the total mass flow of the designated stream, without any substantial chemical separation or reaction being performed on the stream. Minor treating such as removing entrained liquid or drying the stream can be employed. Thus, the recycle stream 16 has substantially the same chemical composition as the product stream 40. Since the recycle stream 16 is almost entirely made up of the selected contaminant, recycling this stream causes the partial pressure of the selected contaminant in the combined gas stream 18 to be greater than the partial pressure in the feed gas stream 12. This in turns causes a shift in the absorption equilibrium which favors increased absorption of the selected contaminant and relatively reduced absorption of the unselected components. The overall separation of selected contaminant from unselected components is significantly improved, while requiring minimal added equipment. A compressor 42 is required in applications where the inlet pressure at the mixer 12 is higher than the discharge pressure at the cooler 38, such as for natural gas sweetening.

Figure 2:
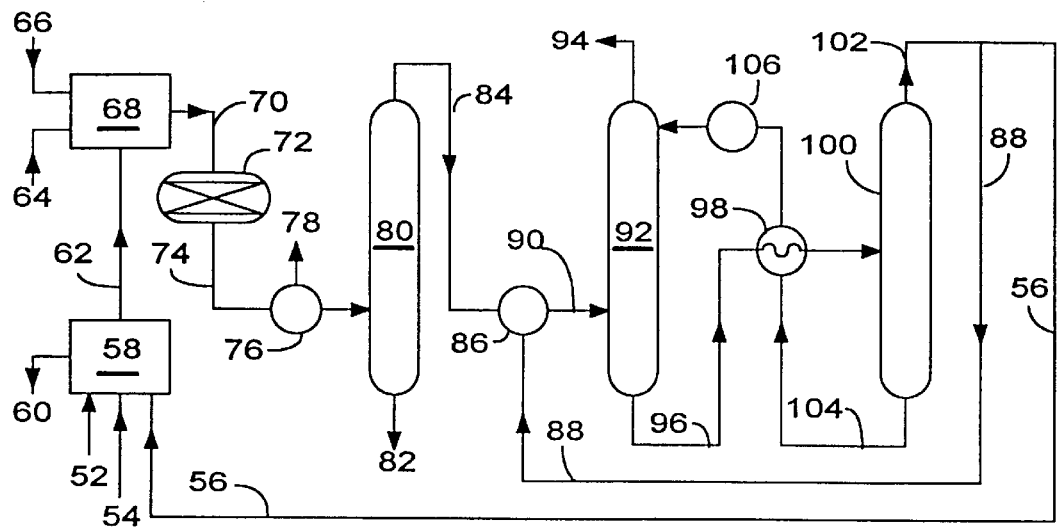
FIG. 2 shows a schematic embodiment of the process for tail gas treatment, using a single absorber/regenerator cycle.

FIG. 2 illustrates another embodiment 50 of the claimed process, adapted to treating acid gas streams in industries such as petroleum refining and coal gasification. An acid gas feed stream 52, air 54, and a hereafter described concentrated acid gas stream 56 are processed in a sulfur recovery unit 58 that discharges an elemental sulfur stream 60 and a tail gas stream 62. Hydrocarbon fuel gas 64 and air 66 are fed along with the tail gas 62 to a reducing gas generator 68 for substoichiometric combustion. As an alternative, the tail gas stream 62 can be combined with a hydrogen rich refinery gas stream (not shown) rather than employing the reducing gas generator 68 and the fuel gas and air streams 64 and 66. A hot gas stream 70 is discharged from the generator 68 and sent to a reactor 72, where sulfur dioxide and sulfur are converted to hydrogen sulfide in the presence of a cobalt-molybdenum catalyst or its equivalent. Carbonyl sulfide and carbon disulfide are also converted to hydrogen sulfide and carbon dioxide in the reactor 72.

An effluent gas stream 74 from the reactor 72 passes through a boiler 76, generating waste low pressure steam 78, and continues to a quench column 80. The quench column 80 emits a sour water stream 82 and a hydrogen sulfide bearing acid gas stream 84 that is treated by the claimed process. A mixer 86 combines the acid gas stream 84 and a hereafter described recycle stream 88, feeding the combined gases 90 to absorber 92, where hydrogen sulfide is absorbed by MDEA or another $H_2S$ selective solvent. Sweetened gas 94 is passed to an incinerator (not shown) for thermal decomposition and disposal. A hydrogen sulfide rich solvent stream 96 is heated in a heat exchanger 98 and fed to a regenerator 100.

In the regenerator 100, the heated solvent gives up its absorbed gases, which emerge as a hydrogen sulfide rich concentrated acid gas stream 102. The lean solvent stream 104, substantially free of $H_2S$, is returned to the absorber 92 after passing through the heat exchanger 98 and a cooler 106. The concentrated acid gas stream 102 is physically split into two streams, with one stream being employed as the recycle stream 88 and the balance 56 being re-processed through the sulfur recovery unit 58. Since the pressures at the sulfur recovery unit 58 inlet and the absorber 92 inlet are substantially equal and somewhat lower than the upstream pressures, the flow rates of the concentrated acid gas stream 56 and the recycle stream 88 can be set by selecting pipe sizes so that there is no need for variable flow control devices such as valves. However, using such a device has other advantages, as will be discussed later.

Figure 3:
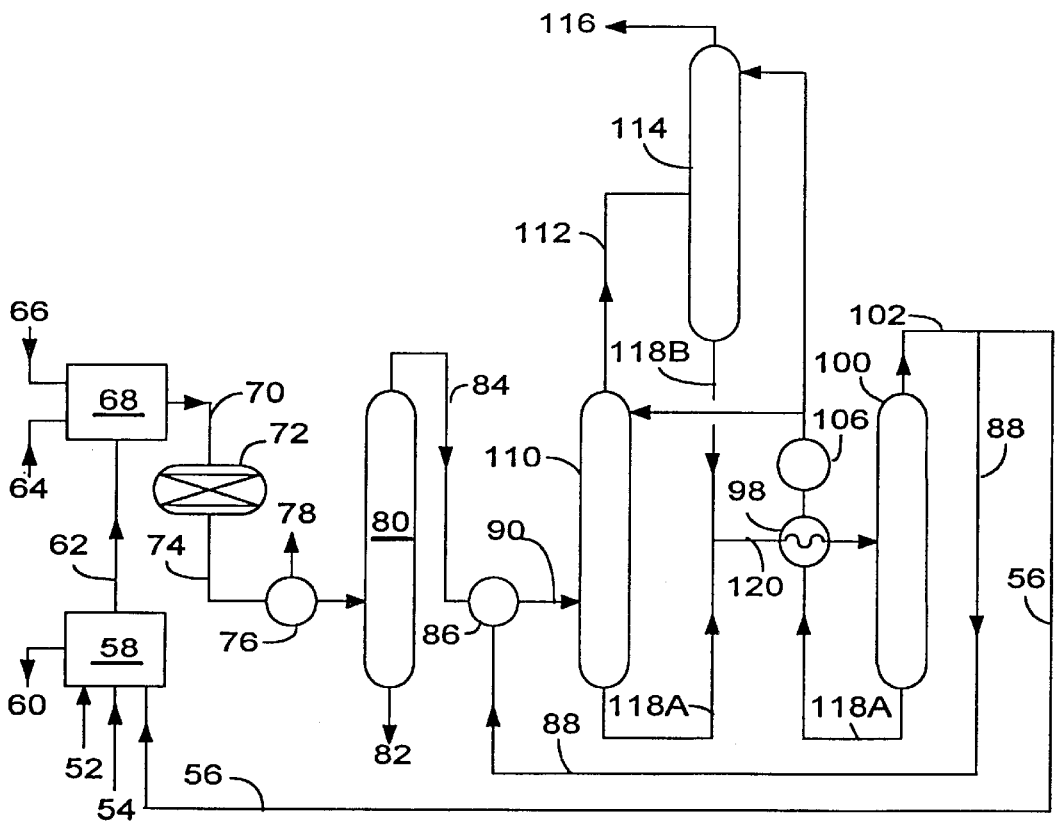
FIG. 3 shows an alternative embodiment thereof, using a multiple absorber/single regenerator cycle.

FIG. 3 shows the process of FIG. 2 using two cascaded absorber columns. Elements in FIG. 3 performing the equivalent function to elements in FIG. 2 are given the same reference numbers. The FIG. 3 process duplicates the FIG. 2 method up to the mixer 86, which now feeds a primary absorber 110. The primary absorber 110 performs the initial absorption of hydrogen sulfide by the solvent. The partially sweetened off gas 112 from the primary absorber 110 is fed to a secondary absorber 114 that further extracts $H_2S$, discharging a sweetened product gas 116 that contains a lower concentration of $H_2S$ than that obtained using the FIG. 2 method. The sweetened product gas 116 is passed to an incinerator (not shown) for final disposal, and in some cases can be sent directly to the incinerator stack, bypassing the incinerator. The $H_2S$ rich solvent streams 118A and 118B from the primary and secondary absorbers 110 and 114 are combined into a single stream 120, that is heated in a heat exchanger 98 and fed to a common regenerator 100. Regenerated solvent, substantially free of selected contaminant, is cooled in the heat exchanger 98 and a cooler 106 and supplied as contaminant lean solvent to both the primary and secondary absorbers 110 and 114. As in FIG. 2, the concentrated acid gas 102 from the regenerator overhead is physically split into two streams, with a recycle stream 88 being sent back to the mixer 86 and the balance 56 being sent to the sulfur recovery unit 58.

The embodiment of FIG. 3 has the advantage of producing a sweetened off gas with lower $H_2S$ concentration, but requires a second absorber.

Figure 4:
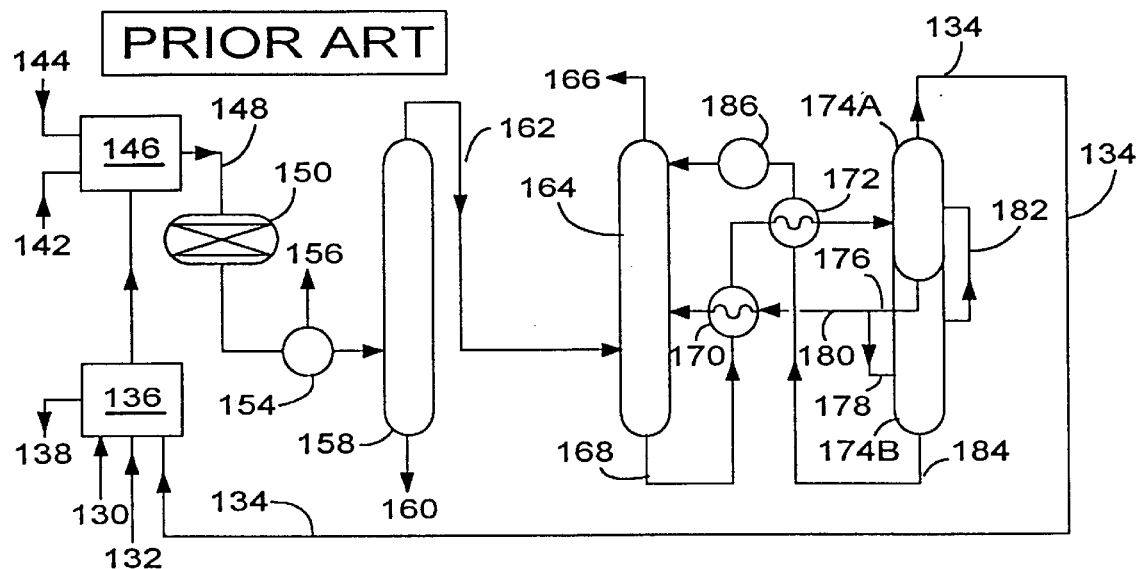
FIG. 4 shows a schematic of the prior art Super-SCOT process.
Figure 5:
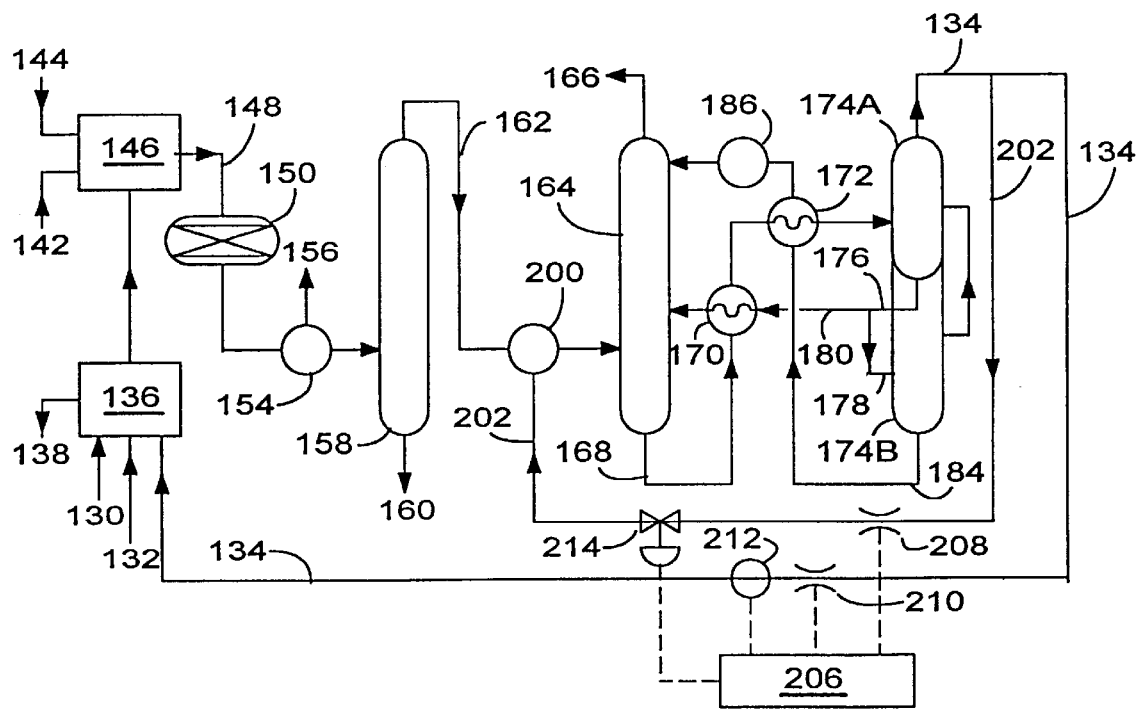
FIG. 5 shows a schematic of a Super-SCOT process adapted to employ the process of the invention.

FIGS. 4 and 5 show a prior art Super-SCOT process, before and after enhancement by the inclusion of the present invention. The prior art method will be discussed first, so that the added features and advantages of the present invention can be contrasted to the prior art afterward. Elements that perform equivalent functions in FIGS. 4 and 5 are given the same reference numbers.

In the conventional Super-SCOT process, an acid gas feed stream 130, air 132, and a hereafter described concentrated acid gas stream 134 are processed in a sulfur recovery unit 136 that discharges an elemental sulfur stream 138 and a tail gas stream 140. Hydrocarbon fuel gas 142 and air 144 are combined with the tail gas 140 and combusted under substoichiometric conditions (i.e. insufficient oxygen for complete combustion) in a reducing gas generator 146. A hot gas stream 148 is discharged from the generator 146 to a reactor 150, where sulfur dioxide and sulfur are converted to hydrogen sulfide in the presence of a cobalt-molybdenum catalyst or it equivalent. Carbonyl sulfide and carbon disulfide are also converted to hydrogen sulfide and carbon dioxide.

An effluent gas stream 152 from the reactor 150 passes through a boiler 154, generating waste low pressure steam 156, and continues to a quench column 158. The quench column 158 emits a sour water stream 160 and a hydrogen sulfide bearing acid gas stream 162 that is treated by solvent extraction.

In an absorber 164, hydrogen sulfide is absorbed by the $H_2S$ selective solvent and sweetened gas 166 is passed to an incinerator (not shown) or the incinerator stack for final disposal. A hydrogen sulfide rich solvent stream 168 is heated in heat exchangers 170 and 172 and fed to a first regenerator section 174A.

In the first regenerator section 174A, the heated solvent gives up its absorbed gases, which emerge as the hydrogen sulfide rich concentrated acid gas stream 134. A lean solvent stream 176 from the first regenerator section 174A is divided, with part 178 being passed to a second regenerator section 174B and the balance 180 being cooled in the heat exchanger 170 and recycled to the absorber 164. The partially processed solvent stream 178 is further treated in the second regenerator section 174B. The released gases 182 from the second regenerator section 174B are returned to the first regenerator section 174A for further treating. A super-lean solvent stream 184 from the second regenerator section 176B is cooled in the second heat exchanger 172 and a separate cooler 186, and recycled to the absorber 164. The concentrated acid gas stream 134 from the regenerator overhead is sent to the sulfur recovery unit 136 for further treating.

In the improved Super-SCOT process of FIG. 5, a mixer 200 is added before the inlet to the absorber 164, and combines the acid gas stream 162 with a recycle stream 202 that is split off from the concentrated acid gas stream 134 discharged from the first regenerator section 174A. The balance 204 of the stream goes to the sulfur recovery unit 136 for further treating.

The concentration of $H_2S$ in the concentrated acid gas stream 134 varies with the percentage of the stream that is employed as the recycle stream 202. As the flow of the recycle stream 202 is initiated and gradually increased, the mass flow rate of the concentrated acid gas stream 134 will decrease, but the mass flow rate of hydrogen sulfide in the stream 134 remain substantially the same. At some point, this effect flattens out so that further increases in flow rate of the recycle stream 202 have no substantial effect on the flow rate of the balance stream 204 sent to the sulfur recovery unit 136.

The optimum recycle stream flow rate is determined by a process controller 206. A flow meter 208 measures the volume flow rate of the recycle stream 202, while another flow meter 210 measures the volume flow rate of the balance stream 204. An analyzer 212 measure the $H_2S$ concentration in the balance stream 204 which is multiplied by the total stream flow rate to find the mass flow of $H_2S$ going to the sulfur recovery unit 136. The controller 206 adjusts the flow rate of the recycle stream 202, using a variable flow restriction 214 (e.g. a control valve), to obtain the smallest practical flow rate for the recycle stream 202 while maintaining the desired mass flow rate of $H_2S$ to the sulfur recovery unit 136.

A comparison of the processes of FIGS. 4 and 5 helps to illustrate some advantages of the claimed process. Assuming that the flow rate and composition of the acid gas feed stream 130 are the same for both systems, the tail gas streams 140 will be substantially equal, as will the other streams prior to the absorber 164. The sweetened gas $H_2S$ concentration will also be roughly equal for both systems. However, the flow rate of the sweetened gas stream 166 will be significantly greater for the invention, due to better separation of the selected contaminant from the unselected components.

The claimed invention has been shown in several embodiments. It should be apparent to those skilled in the art that the invention is not limited to these embodiments, and is amenable to various modifications and changes within the scope of the claims and this specification.

What is claimed is:

1. A process for removing a selected contaminant from a feed gas stream also containing at least one unselected component, comprising the steps of:

a) combining the feed gas stream with a recycle stream to form a combined gas stream;

b) contacting the combined gas stream with a contaminant lean solvent that absorbs the selected contaminant, resulting in a contaminant rich solvent stream and a sweetened gas stream;

c) regenerating the contaminant rich solvent stream, producing the contaminant lean solvent stream and a contaminant rich gas stream that is at least partially employed as the recycle stream in step (a); and d) recycling the recycle stream to the combining step (a).

2. The process recited in claim 1, wherein the selected contaminant comprises hydrogen sulfide, and the at least one unselected component comprises carbon dioxide.

3. The process of claim 2 wherein the solvent is an organic amine.

4. The process recited in claim 3, wherein the selected contaminate further comprises carbonyl sulfide and carbon disulfide.

5. The process recited in claim 1, wherein the selected contaminant comprises carbon dioxide and the unselected component comprises natural gas.

6. The process recited in claim 5, wherein the solvent is a physical solvent.

7. The process recited in claim 1, further comprising the step of drying the recycle stream prior to combining the recycle stream with the feed gas stream.

8. The process recited in claim 1, further comprising the step of removing entrained liquid from the recycle stream prior to combining the recycle stream with the feed gas stream.

9. The process recited in claim 1, wherein the balance of the contaminant rich gas stream in step (c) is employed as a product stream, and further comprising the step of measuring the flow rates of the product stream and the recycle stream, and varying the flow rate of the recycle stream so as to reduce the total mass flow rate of the product stream while maintaining a substantially constant mass flow rate of the selected contaminant in the product stream.

10. A treating process for the removal of sulfurous components from a feed gas stream that is treated in a sulfur recovery unit and discharged as an acid gas stream, the process comprising:

a) combusting the acid gas stream from the sulfur recovery unit with a hydrocarbon gas stream and an oxygen-bearing stream, followed by catalytically converting at least some of the sulfurous components in the resulting hot gas stream to hydrogen sulfide and discharging an effluent gas stream;

b) combining the effluent gas stream with a recycle stream to form a combined gas stream;

c) contacting the combined gas stream with a contaminant lean solvent that absorbs hydrogen sulfide, resulting in a hydrogen sulfide rich solvent stream and a sweetened gas stream;

d) regenerating the hydrogen sulfide rich solvent, producing a hydrogen sulfide lean solvent stream and a concentrated acid gas stream that is at least partially employed as the recycle stream in step (b);

e) recycling the recycle stream to the combining step (b); and f) sending the balance of the concentrated acid gas stream as a product stream to the sulfur recovery unit, to be combined with the feed gas stream prior to treatment in the sulfur recovery unit.

11. The process of claim 10 wherein the solvent is an organic amine.

12. The process recited in claim 10, further comprising the step, occurring between steps (a) and (b), of cooling the effluent gas stream in a waste heat boiler, thereby producing steam, and sending the effluent gas stream cooled in the boiler to a quench tower that quenches the effluent gas and discharges a quenched effluent gas and a sour water stream, the quenched effluent gas being employed as the effluent gas in the combining step (b).

13. The process recited in claim 10, further comprising the step of drying the recycle stream prior to combining the recycle stream with the effluent gas stream.

14. The process recited in claim 10, further comprising the step of removing entrained liquid from the recycle stream prior to combining the recycle stream with the effluent gas stream.

15. The process recited in claim 10, further comprising the step of measuring the flow rates of the recycle stream and the product stream, and varying the flow rate of the recycle stream so as to reduce the total mass flow rate of the product stream while maintaining a substantially constant mass flow rate of the selected contaminant in the product stream.

* * * * *